US007850923B2

(12) United States Patent
Byrd

(10) Patent No.: US 7,850,923 B2
(45) Date of Patent: Dec. 14, 2010

(54) CONTAINER FOR MAINTAINING STABILIZED CONTROL SOLUTION AND CONTAINER FOR SINGLE-USE CONTROL SOLUTION INCLUDING PRIOR USE INDICATOR

(75) Inventor: Randy Byrd, Pepperell, MA (US)

(73) Assignee: Bionostics, Inc., Devens, MA (US)

( * ) Notice: Subject to any disclaimer, the term of this patent is extended or adjusted under 35 U.S.C. 154(b) by 346 days.

(21) Appl. No.: 11/936,195

(22) Filed: Nov. 7, 2007

(65) Prior Publication Data

US 2008/0135559 A1 Jun. 12, 2008

Related U.S. Application Data

(63) Continuation-in-part of application No. 11/121,592, filed on May 4, 2005, now abandoned.

(60) Provisional application No. 60/857,391, filed on Nov. 7, 2006.

(51) Int. Cl.

| | |
|---|---|
| ***B01L 3/00*** | (2006.01) |
| ***B65D 25/04*** | (2006.01) |
| ***B65D 25/36*** | (2006.01) |
| ***G01N 31/22*** | (2006.01) |

(52) U.S. Cl. .......................... 422/102; 422/55; 422/56; 422/58; 422/99; 436/8; 436/164; 436/165; 436/169; 220/506; 220/507; 220/523; 215/230

(58) Field of Classification Search .................. 422/55, 422/56, 58, 61, 99, 102; 436/8, 14, 164, 436/165, 169, 163; 220/359.3, 500, 506, 220/507, 523; 215/230, 250
See application file for complete search history.

(56) References Cited

U.S. PATENT DOCUMENTS 3,899,295 A * 8/1975 Halpern ...................... 422/56

(Continued)

FOREIGN PATENT DOCUMENTS

EP 1024362 8/2000

(Continued)

OTHER PUBLICATIONS

Partial International Search Report for corresponding PCT Application No. PCT/US2007/083869.

(Continued)

*Primary Examiner*—Maureen M Wallenhorst
(74) *Attorney, Agent, or Firm*—McDermott Will & Emery LLP

(57) ABSTRACT

Aspects and embodiments of the present disclosure are directed to devices and methods for the containment and presentation of a control solution to a medical device. Such devices and methods can be directed to containers (e.g., containment and presentation devices) that include structures such as nested containment wells for maintaining a stabilized control solution. Embodiments can include an indicator, such as one to indicate status of a seal for a container and/or for a liquid inside such a container.

21 Claims, 14 Drawing Sheets

U.S. PATENT DOCUMENTS

| | | | | |
|---|---|---|---|---|
| 3,933,440 | A * | 1/1976 | Woolley | 422/102 |
| 4,116,336 | A * | 9/1978 | Sorensen et al. | 206/524.8 |
| 4,678,754 | A | 7/1987 | Hoskins | |
| 4,960,708 | A * | 10/1990 | Zowtiak et al. | 436/11 |
| 4,986,965 | A * | 1/1991 | Ushikubo | 422/102 |
| 5,265,745 | A | 11/1993 | Pereyra et al. | |
| 5,272,093 | A | 12/1993 | Silva et al. | |
| 5,542,236 | A | 8/1996 | Miller | |
| 5,587,321 | A | 12/1996 | Smith et al. | |
| 5,617,812 | A * | 4/1997 | Balderson et al. | 116/206 |
| 5,780,302 | A | 7/1998 | Conlon et al. | |
| 5,881,879 | A | 3/1999 | Faict et al. | |
| 6,221,625 | B1 | 4/2001 | Ashihara et al. | |
| D443,695 | S | 6/2001 | Heitz et al. | |
| 6,451,606 | B1 | 9/2002 | König et al. | |
| 6,638,249 | B1 | 10/2003 | Lal et al. | |
| 6,688,467 | B2 | 2/2004 | Krupka et al. | |
| 6,887,709 | B2 | 5/2005 | Leong | |
| 6,938,757 | B2 * | 9/2005 | Eastman et al. | 206/219 |
| 7,001,344 | B2 | 2/2006 | Freeman et al. | |
| 2002/0002344 | A1 | 1/2002 | Douglas et al. | |
| 2002/0078947 | A1 | 6/2002 | Gumaste | |
| 2002/0103499 | A1 | 8/2002 | Perez et al. | |
| 2002/0169394 | A1 | 11/2002 | Eppstein et al. | |
| 2003/0021726 | A1 | 1/2003 | Wu et al. | |
| 2003/0083685 | A1 | 5/2003 | Freeman et al. | |
| 2003/0211616 | A1 * | 11/2003 | Leong | 436/8 |

FOREIGN PATENT DOCUMENTS

| | | |
|---|---|---|
| EP | 1362788 | 11/2003 |
| WO | 9702140 | 1/1997 |
| WO | 2005009868 | 2/2005 |
| WO | 2006118843 | 11/2006 |

OTHER PUBLICATIONS

International Search Report for corresponding PCT Application No. PCT/US2007/083869, 6 pp, Sep. 11, 2008.

Written Opinion for corresponding PCT Application No. PCT/US2007/083869, 9 pp, Sep. 11, 2008.

* cited by examiner

CONTAINER FOR MAINTAINING STABILIZED CONTROL SOLUTION AND CONTAINER FOR SINGLE-USE CONTROL SOLUTION INCLUDING PRIOR USE INDICATOR

RELATED APPLICATIONS

This application is a continuation-in-part of U.S. application Ser. No. 11/121,592, filed 4 May 2005 now abandoned, the contents of which are incorporated herein in their entirety by reference. This application claims the benefit of U.S. Provisional Patent Application Ser. No. 60/857,391 filed 7 Nov. 2006, the contents of which are incorporated herein in their entirety by reference.

BACKGROUND

In many medical and laboratory applications, it is necessary to provide or administer a single-dose or an exactly measured dose of a liquid agent, such as medication, reagents, and control solutions for evaluating diagnostic systems. Particularly in laboratory applications and in certain medical applications involving diagnostic tests, reagents are required to be provided in very precise amounts in an assay process. For such purposes, certain agents and reagents are provided in containers or packages which hold only a single dose of liquid or which provide for the delivery of only a single dose from a multi-dose volume of liquid.

One such application in which precise amounts of reagent fluid are required is in the fabrication and patient use of systems for measuring analyte (such as glucose, cholesterol, and narcotics or the like) concentrations in a physiological fluid, such as blood, interstitial fluid, urine, and saliva. Such systems typically include test strips containing a reagent material to which a physiological sample is applied, and meters configured for receiving the test strips and determining the target analyte concentration of the sample on the test strip.

During the manufacturing and fabrication of the test strips, the strips are typically quality control checked by batch sampling methods in which a monitoring agent, often called a control solution, formulated to mimic blood is used to test the accuracy and efficacy of the test strips. Examples of such control solutions are disclosed in U.S. Pat. Nos. 5,187,100 and 5,605,837. The accuracy of test strip meters is also checked during the manufacturing process by using the meter with test strips known to meet quality control standards and having such a control solution applied to them.

Such quality control of test strips and meters is similarly performed directly by the patient or user of such meters and test strips as well as medical personnel treating such a patient. The patient or medical worker is supplied with a control solution, such as when receiving a meter or obtaining a new package of test strips, and is typically instructed to perform a quality control check upon the occurrence of any of the following events: opening a new package of test strips; using a new meter; when training or learning to use the meter and test strips; after the meter is dropped or the like; when the analyte measurement results do not reflect how the patient is currently feeling (e.g., when a glucose measurement result indicates a substantially high level of blood glucose level but the patient is feeling quite normal); or when a glucose measurement result is normal but the patient is feeling sick.

Control results that fall outside an expected range may indicate: user procedural error; a dirty meter or test strip container; test strip contamination, deterioration, damage or expiration; meter malfunction; control solution expiration; and/or a control solution which is outside of an acceptable temperature range, etc.

The above-described control solutions are typically packaged in a plastic container or a glass vial. FIG. 1 illustrates an example of a prior art container 1 with a removable cap 2 used for containing and dispensing a control solution The dispensing end of these containers is typically configured with a small opening at the end of a taper 3 through which a relatively imprecise droplet of control solution can be dispensed by squeezing the bottle.

With continued reference to FIG. 1, the container 1 holds a volume of liquid control solution, typically having a volume of about 3 to 5 ml, which provides about 100 to 200 dosages which typically lasts about three months. To apply the control solution, the cap 2 is removed and the container 1 is tilted so that that its dispensing portion 3 is held several millimeters over a test strip's reagent area. The user then applies a slight squeeze pressure to container to dispense a droplet of the control solution onto the reagent area.

Such containers and the steps for dispensing control solution from them have their drawbacks. For example, the container is repeatedly opened over an extended period of time, thereby repeatedly exposing the control solution to contaminants in the air and on surfaces, such as the user's fingers, which carry contaminants. In addition, because the users of such control solutions may often have poor dexterity (such as diabetics), a user may frequently fumble and/or drop the cap, which may further contaminate the solution. Such contamination can cause erroneous analyte test results. If it is determined that the control solution has become contaminated the entirety of the control solution must be thrown away, and a new container opened, which can become costly. Moreover, when this happens, a new container of control solution may not be readily available to the user, possibly leaving him or her in a medically risky situation.

Furthermore, such prior art control solution containers are problematic in that, because such a relatively large volume of the control solution is provided, the efficacy of the control solution may expire well before a majority of the control solution is used, which also adds to the cost of treating the patient. The shelf-life of the control solution sealed within its original containment is usually about one to two years, but once the user opens the solution container, the shelf-life quickly drops to only a few months due to the contamination problem mentioned above.

In addition, the user may forget to replace the cap on the container causing the control solution to evaporate thereby changing the analyte concentration which results in erroneous values. Additionally, it can be difficult to precisely and accurately dispense the requisite volume of the control solution from within such prior art containers. The volume dispensed is highly user dependent in that the user may apply too much control solution by over-squeezing the container or may apply too little solution by not squeezing enough.

There is yet another drawback of prior art control solution dispensers: while advancements are rapidly being made in the development of systems and devices for measuring analyte concentrations, there has been limited advancement in the area of control solution containment and dispensing for use with these advanced systems and devices.

In particular, advancements have been made in minimizing the pain experienced by the patient in obtaining a sample of blood or interstitial fluid as well as in minimizing the time and the number of steps necessary to carry out a glucose concentration measurement. The former has been accomplished by reducing both the sample volume size necessary to effect an accurate analyte measurement and the size of the needle for obtaining the sample fluid. The latter has been realized by the integration of various components used for the measurement process.

Specifically, microneedles are now being integrated with test strips. In these tester devices, the integrated needle/test strips include a capillary channel which extends from an opening in the distal tip of the microneedle to the sensor reagent area or matrix area within the test strip.

Additionally, in certain of these embodiments, the tester is partially dispensed from the meter in an automatic or semi-automatic manner for accessing and collecting the sample fluid, yet remains electrically or photometrically (as the case may be) in contact or engaged with the meter during such fluid access and collection, thereby obviating the need for the user to handle the test strip.

The microneedle configuration clearly saves time and reduces the risk if injury to the patient and contamination to the strip and meter. As such, in a single step, physiological fluid can be accessed (by penetrating the skin with the microneedle), transferring only the minimum amount of sample necessary to the sensor (by means of the capillary channel) and determining the target analyte concentration within the sample (by means of the engaged meter).

In order to evaluate the performance of such an integrated system, the meter is equipped with "on board" diagnostic electronics and software, and a control solution is provided for testing the efficacy of the test strip's sensor.

While the prior art control solution dispensers can be used in this case to evaluate the test strips by dispensing a droplet of control solution on to the designated sensor area of the test strip as mentioned above, there is no provision for evaluating the effectiveness of the integrated microneedle. One could deposit a droplet of control solution onto a sterilized substrate and position the microneedle tip within the droplet to evaluate the effectiveness of the capillary channel; however, such requires an additional component and additional steps with a very high risk of contamination of the control solution if the substrate is not adequately sterilized.

Even if a sterile substrate can be ensured for such prior art techniques, there is no means to truly mimic operating conditions wherein the needle is dispensed in a manner to penetrate the skin surface and wick accessed fluid there beneath. More specifically, factors like the ability of the needle to penetrate skin at the speed, angle, and depth as occurs under actual operating conditions, the tip strength of the needle, and the ability of the needle to provide suitable capillary action to fluid from within a solid medium, are unable to be evaluated.

As such, there is a need for improved techniques and systems for containing and dispensing control solutions and other reagents and agents for single-dose usage.

SUMMARY

The present disclosure relates to systems, methods, and displays that address the problems noted previously for the prior art. Systems and techniques according to the present disclosure are directed to containers for maintaining a stabilized control solution and/or containers for single-use control solution, including a use-status indicator.

Aspects and embodiments of the present disclosure are directed to devices and methods for the containment and presentation of a control solution to medical devices, e.g., those that in operation draw blood via a lancet from the finger of a patient/user. Such containment and presentation devices can include structures such as nested containment wells for maintaining a stabilized control solution. Embodiments can include an indicator, such a prior use indicator or pH indicator, to indicate status of a seal of a container and/or a control solution within a container.

Other features and advantages of the present disclosure will be understood upon reading and understanding the detailed description of exemplary embodiments, described herein, in conjunction with reference to the drawings.

BRIEF DESCRIPTION OF THE DRAWINGS

Aspects of the disclosure may be more fully understood from the following description when read together with the accompanying drawings, which are to be regarded as illustrative in nature, and not as limiting. The drawings are not necessarily to scale, emphasis instead being placed on the principles of the disclosure. In the drawings.

Figure 1:
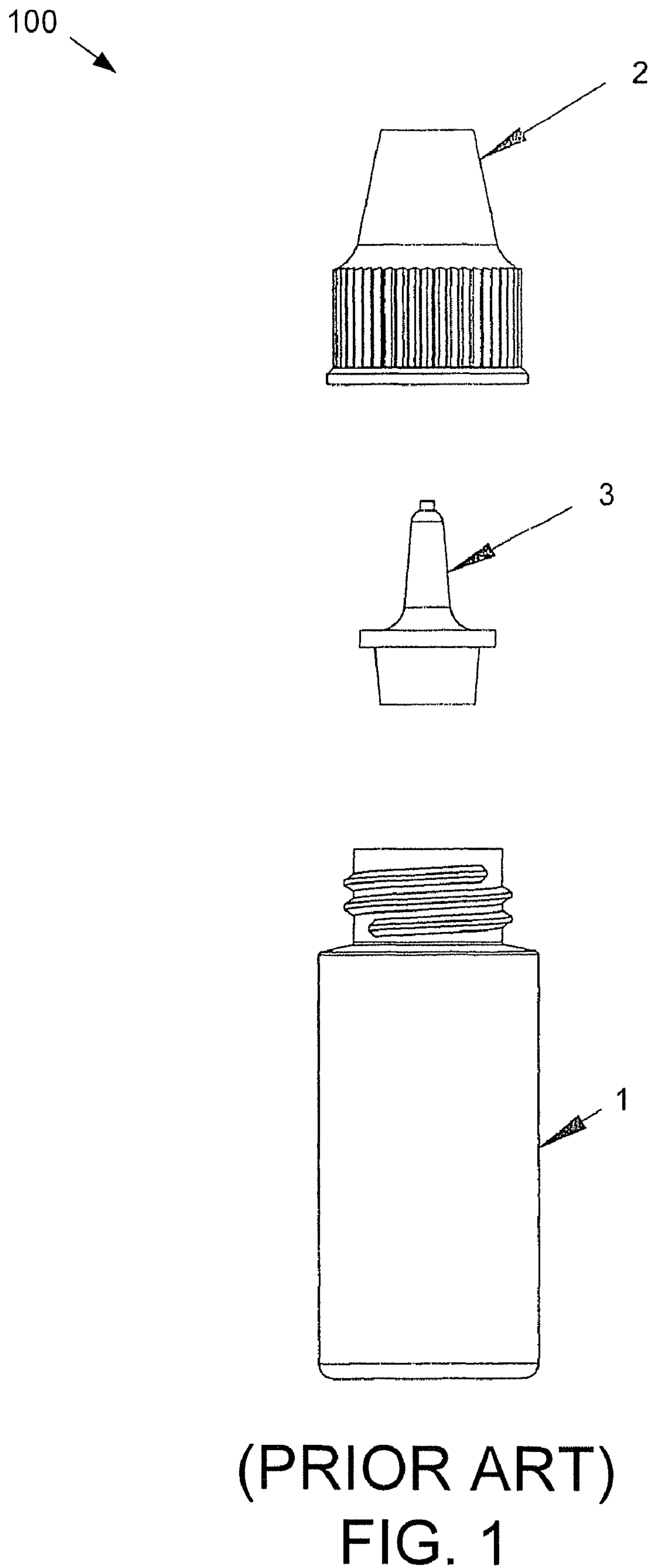
(PRIOR ART) FIG. 1
FIG. 1 illustrates an example of a prior art container used for containing and dispensing a control solution.

While certain embodiments are depicted in the drawings, one skilled in the art will appreciate that the embodiments depicted are illustrative and that variations of those shown, as well as other embodiments described herein, may be envisioned and practiced within the scope of the present disclosure.

DETAILED DESCRIPTION

The present disclosure is directed to devices/systems and methods useful for the containment of a control solution (e.g., a liquid solution containing a controlled amount of one or more given chemical/analytes) and presentation of such a solution to a medical device, e.g., for calibration of the medical device. Such medical devices useful with embodiments of the present disclosure can include and/or contain a lancet that is intended to pierce the skin of a patient's finger when placed into an orifice on the device.

Embodiments of control containment devices according to the present disclosure can: (1) present a control liquid to a medical device in a manner simulating a patient's finger; (2) contain a control solution in a manner to preserve the integrity of the solution over an extended time; and/or (3) present an indication as to the state of usefulness of a container holding a control solution, e.g., "used" or "unused," or a status of a physical attribute of the control solution itself, e.g., pH.

In accordance with the present disclosure, control solution containers, applicators, or containment devices/systems can be configured and arranged to fit within a target area of a medical device, e.g., portable glucose measuring device. Insertion of such a containment device/system into the particular intended medical device can serve to actuate a mechanical sensor and thereby activate a spring-loaded lancet of the medical device. Such a lancet can be directly incorporated to a sensor, and so, on penetration of the applicator, it can 'sip' the control liquid directly through the lancet to the sensor.

Embodiments of the present disclosure provide a system (e.g., a containment and presentation device), consisting of a body or container for containing a control solution, and a cover including a foil laminate material that is suitable for covering a portion of the container. Such a cover can serve as a barrier to contain the liquid, and, in some applications, can simulate the skin for the 'piercing' action of the lancing device of a medical device. When pressed into the target area of the device, the container system has enough length and rigidity to activate the spring-loaded lancet and sensor. A further functional feature of such applicators/systems is that they are not prone to leaking control solution, as pressurization of the container is not required.

Figure 2:
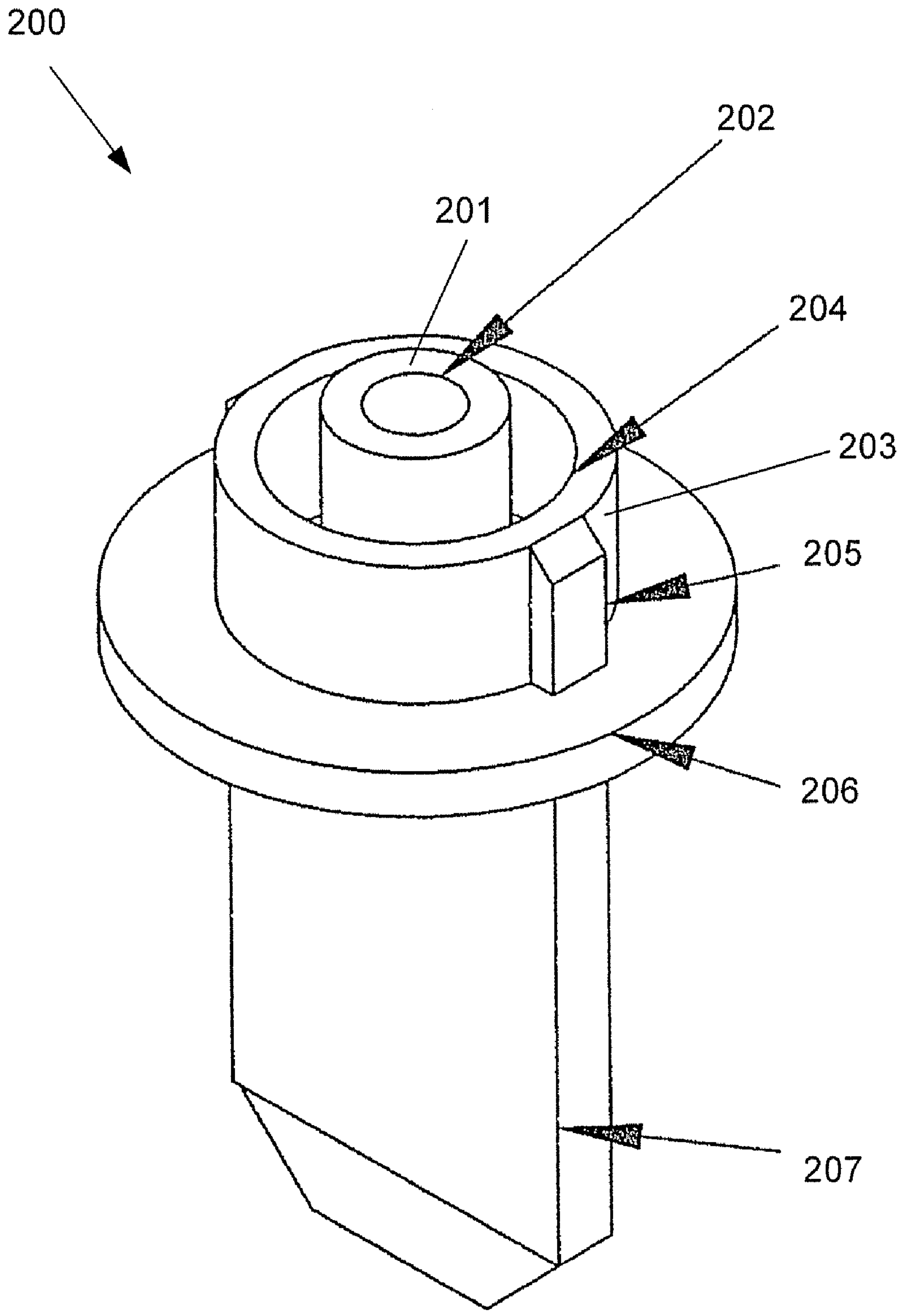
FIG. 2 illustrates the physical attributes of one embodiment of the of the liquid containment structure of the present disclosure.

FIG. 2 illustrates one embodiment of a liquid containment structure/system 200 according to the present disclosure. System 200 has a body that includes an inner wall 201 defining an inner well 202 that is suitable for containing a control solution. System 200 may, optionally, include an outer wall 203 defining an outer well, e.g., concentric with the inner wall 201. The walls 201, 203 can be disposed on a platform 206. Liquid containment system 200 can include a large, flat surface or base 207 to serve as a handle to facilitate use. Base 207 can also be used as space to allow for the imprint of identifying marks such as lot or batch number and product identification.

Structure 200 can be used to present a control solution reliably to a lancet on piercing by precise filling of the inner well of the applicator prior to sealing, e.g., using a defined combination of pressure, temperature and time, with a cover 208 (e.g., laminate foil) as shown in FIGS. 3-6.

Figure 3:
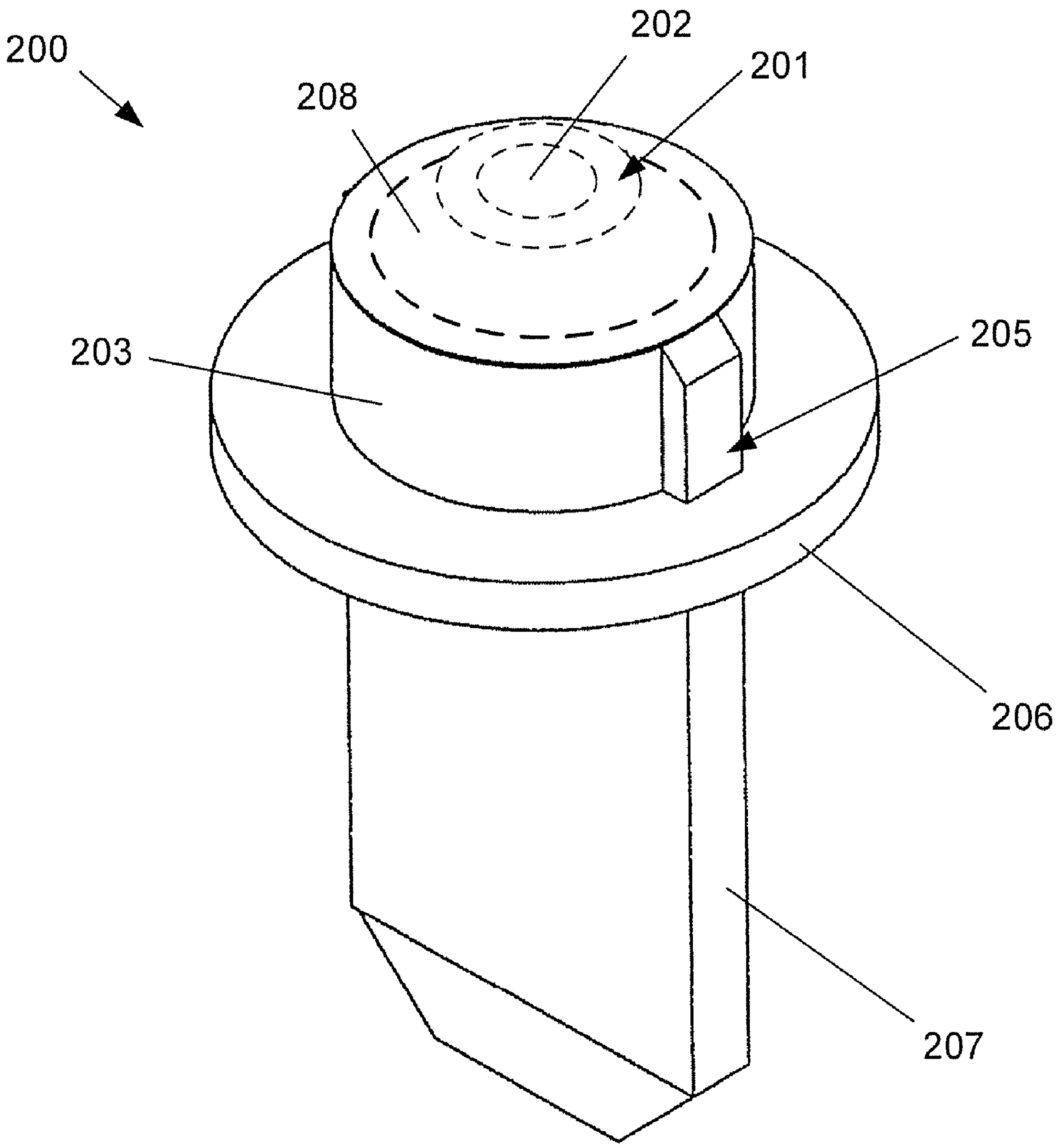
FIG. 3 is a perspective view of the liquid containment structure embodiment of FIG. 2 with the addition of a foil laminate seal.
Figure 4:
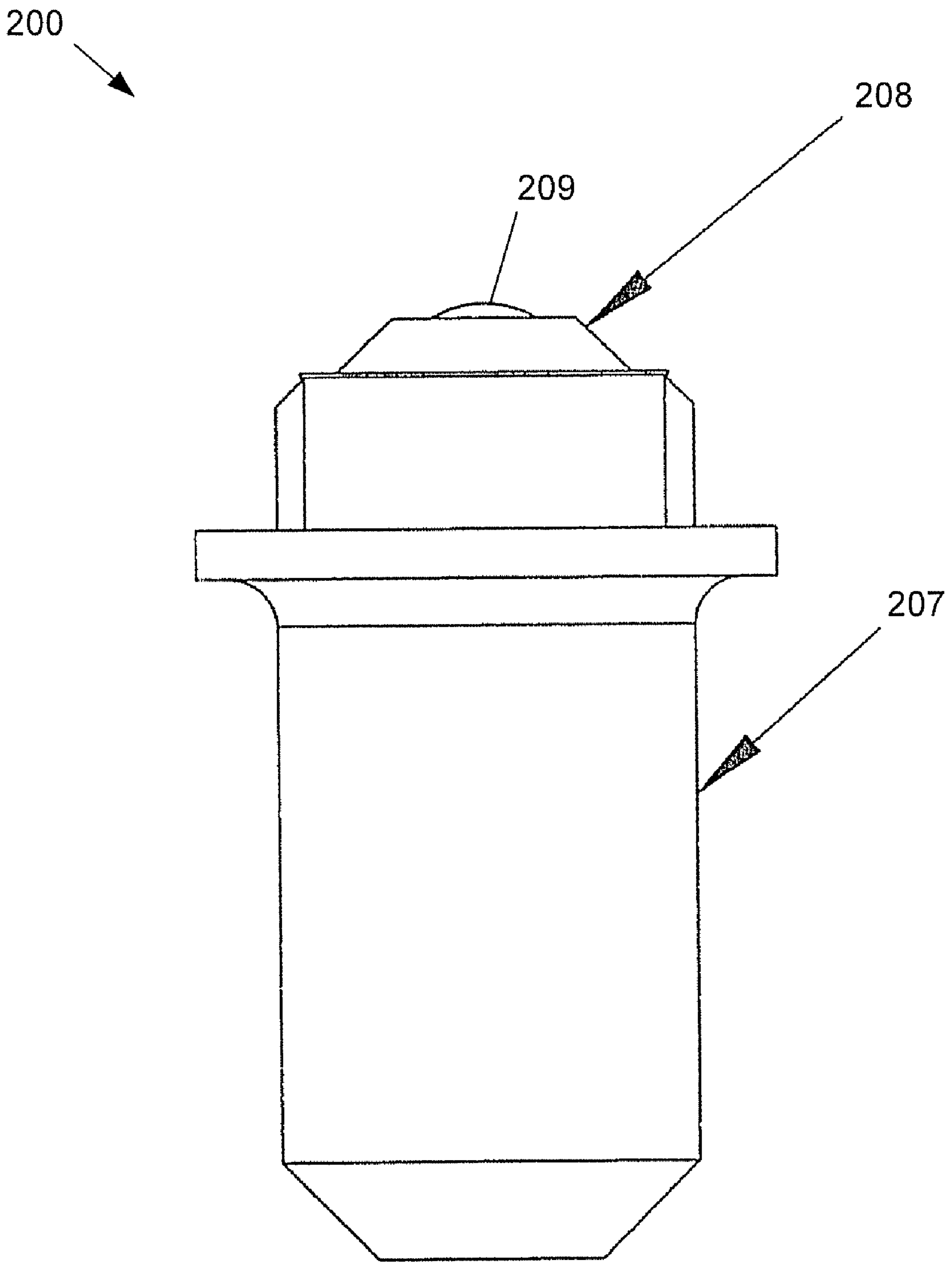
FIG. 4 is a front planar view of the liquid containment structure and foil laminate seal of FIG. 3.
Figure 5:
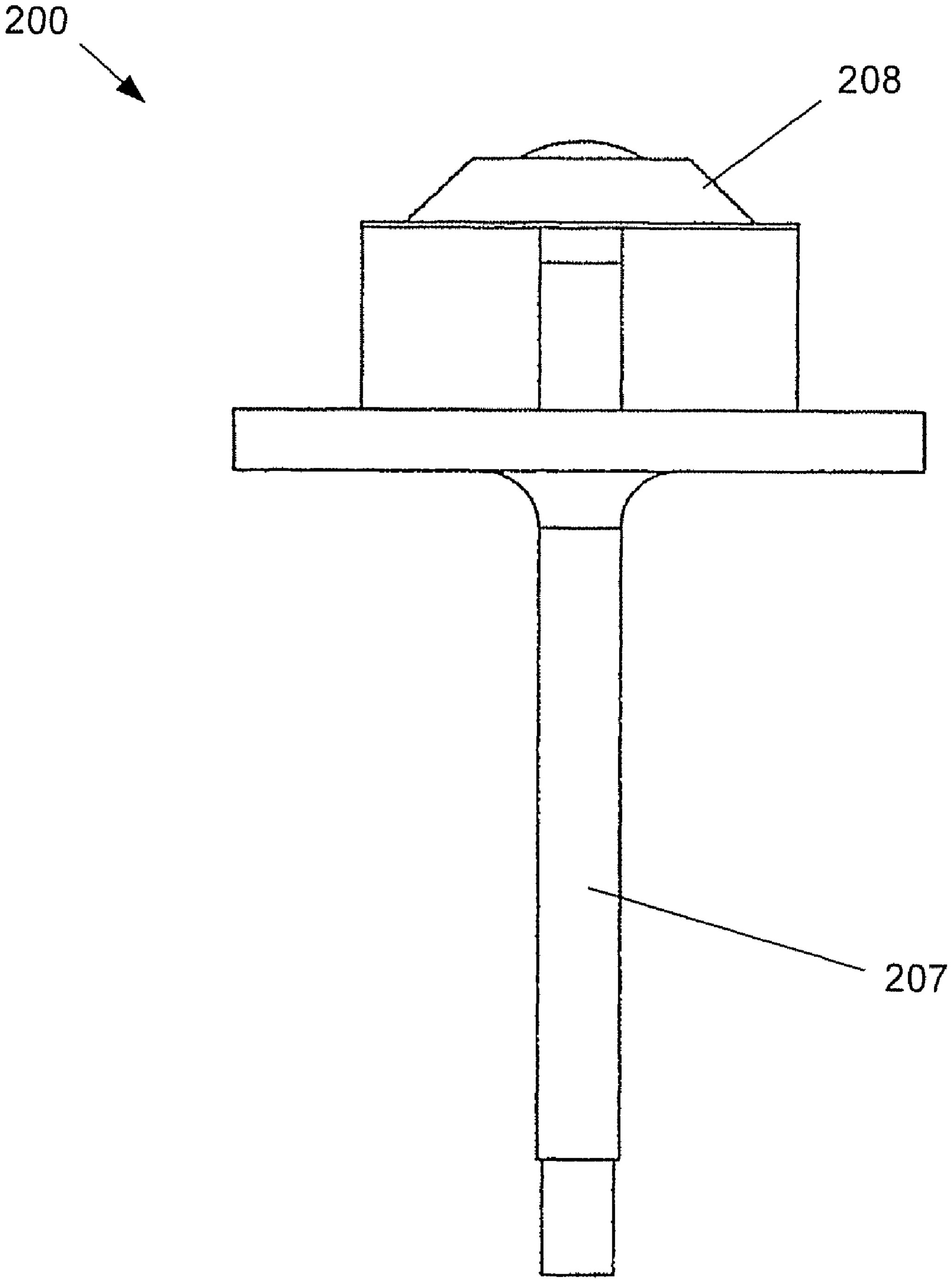
FIG. 5 is a side planar view of the liquid containment structure and foil laminate seal of FIG. 3.
Figure 6A:
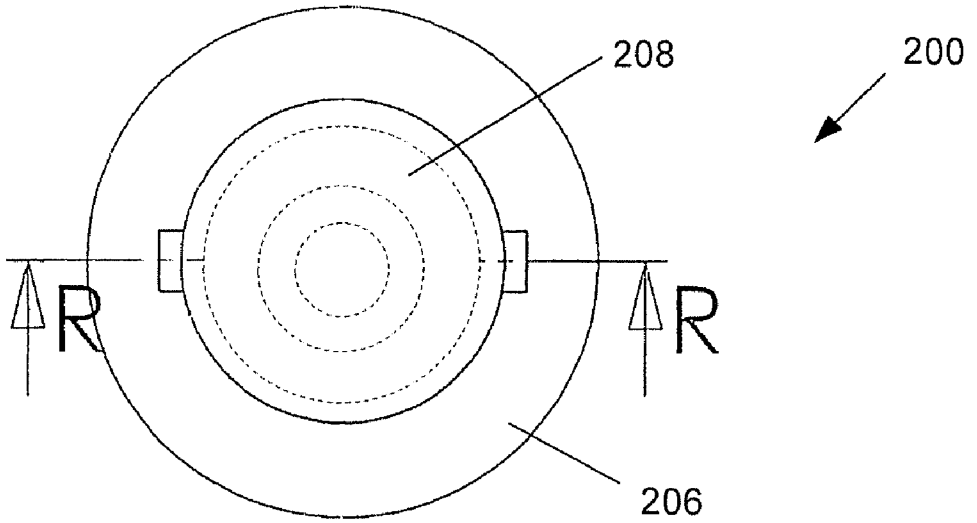
FIG. 6A is a top-down planar view of the liquid containment structure of FIG. 3.
Figure 6B:
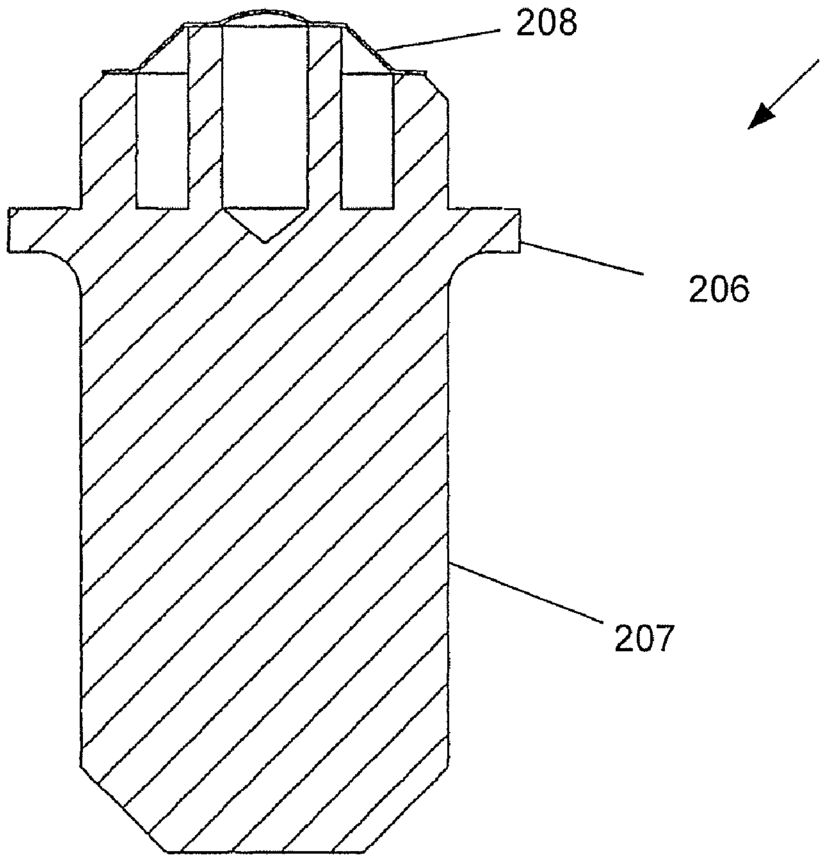
FIG. 6B is a sectional view of the containment structure of FIG. 6A taken along cutting plane R-R.

FIG. 3 is a perspective view of the liquid containment structure embodiment of FIG. 2 with the addition of foil laminate seal/cover 208. FIG. 4 is a front planar view of the liquid containment structure and foil laminate seal of FIG. 3. FIG. 5 is a side planar view of the liquid containment structure and foil laminate seal of FIG. 3. FIG. 6A is a top-down planar view of the liquid containment structure of FIG. 3; FIG. 6B is a sectional view of the containment structure of FIG. 6A taken along cutting plane R-R.

With continued reference to FIGS. 2-6, containment structure 200 can further be enhanced for use by the inclusion of small tabs 205 to guide the structure 200 reliably to the target area of the intended medical device, thereby serving to ensure/facilitate a good 'strike' by the lancet of the medical device.

With particular reference to FIG. 4, a further functional feature is that applicators/systems can have at all times (or substantially all times) a liquid available for contact to the penetrating lancet, in any direction of use. This multi-directional capability is shown by the rounded feature 209 of the central portion of cover 208.

Aspects and embodiments of the present disclosure can provide suitable protection for the liquid (control) solutions intended for containment by addressing loss of liquid as vapor through the containment structure(s), e.g., 201. Embodiments of the present disclosure can address other liquid loss, such as through the cover 208, as will be described below.

Because it is desirable in many situations for there to be very small loss of liquid (<5%) over the life of a medical device monitoring product (e.g., in order to remain useful in its purpose as a control solution to monitor the performance of the medical device), control of evaporation is of great concern. However, certain specified components of the solution may also deteriorate over time. For example, in the case of a glucose control solution, decrease in glucose occurs due to oxidation over time, while evaporation of water increases the glucose concentration.

In embodiments of the present disclosure, these two phenomena may be balanced by manipulation of factors affecting rate of evaporation (e.g., container material, flexible membrane material, fill volume) and factors affecting the rate of oxidation (e.g., like pH), to accommodate a certain control of change over time and therefore improve the useful storage life of the control solution product.

Embodiments of the present disclosure can balance such above-described factors for control liquids/solutions. For example, a presentation and containment device construction as described herein can include one or more (e.g., multiple) vapor barriers to reduce water loss, and the selection of materials to further control evaporation. For example, with a nominal wall thickness of 100 μm at 26° C./65% Relative Humidity, high density polyethylene (HDPE) has roughly one third the water vapor transmission rate as low density polyethylene (LDPE) (0.4 to 1.4 g/m$^2$/day). Thus, by altering the material used in the construction of the containment device, the rate of water loss can be controlled.

Further, in embodiments of present disclosure, the water loss through evaporation can be further controlled by the use of a secondary fill liquid. As seen in the drawings (e.g., inner well 202 in FIG. 2), the center portion of a device 200 of the present disclosure can be used for containment and presentment of the control solution to a lancet of a medical device for sampling. A secondary compartment (e.g., outer well 204 in FIG. 2) can surround this center space and may be additionally filled with liquid to provide an additional water vapor pressure within this surrounding space to significantly reduce water loss by evaporation from the center well. This capability may be used in addition to the water vapor barrier provided by the materials used for the device 200 and sealing foil 208 to balance evaporation to the loss of glucose by oxidation to provide and enhanced useful life of the control solution in the device 200.

The material utilized for the flexible seal 208 can be altered to further adjust the water vapor loss of the device 200, but this barrier generally contributes the smallest portion of the total water loss. For example, a typical flexible foil laminate may have a water vapor transmission rate of 0.0006 $g/m^2$/day, or less than 0.04% of the rate of HDPE in the walls of the device for certain embodiments/applications.

Devices/methods according to the present disclosure may provide (in addition or alternative to the features described previously) a status indicator, e.g., a visually obvious indication of use (status). Because exemplary embodiments can be a single-use device/method, it is preferable that such work the first time, every time. For this reason, according to embodiments of the present disclosure, a flexible foil barrier film having a paper layer may be used to seal the associated presentation and containment device.

Figure 7A:
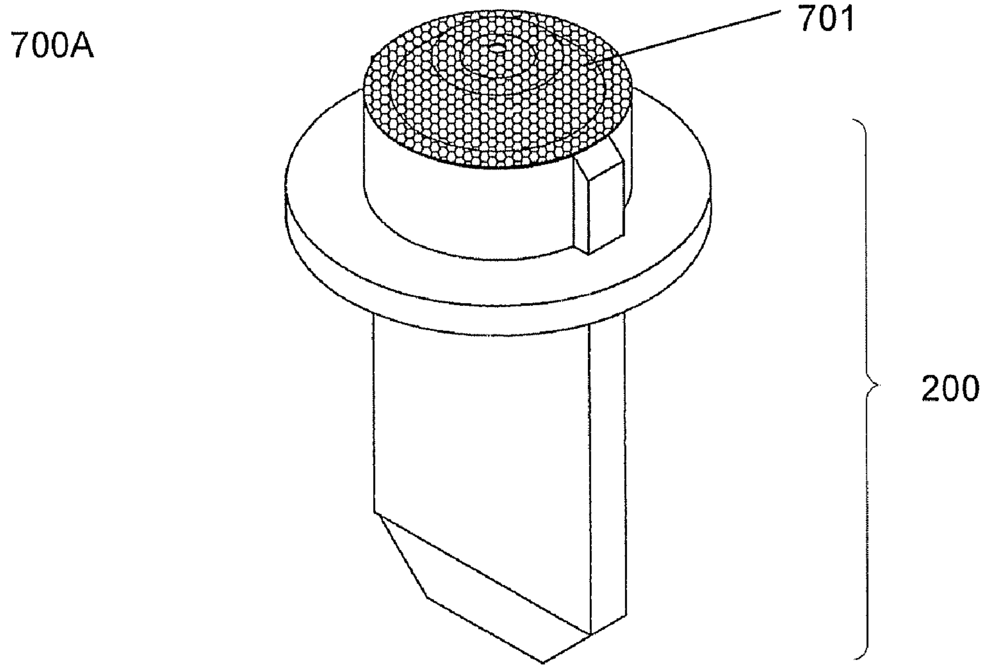
FIGS. 7A and 7B are perspective views depicting utilization of a foil barrier film, in accordance with further embodiments of the present disclosure.
Figure 7B:
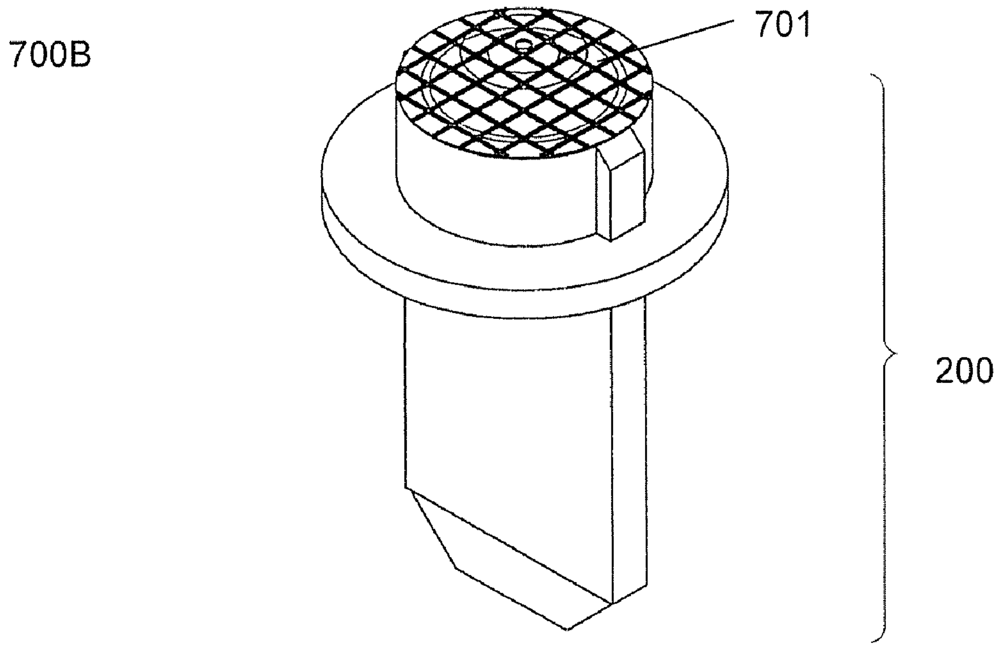

FIGS. 7A and 7B are perspective views depicting utilization of a cover having a foil barrier film or paper layer 701 acting as a status indicator, in accordance with further embodiments 700A, 700B of the present disclosure. Such a cover can be used to seal containment structure/systems described herein, e.g., system 200 of FIG. 2.

The paper layer 701 shown can allow for printing of artwork or other identification, and can also serve to wick solution from within the containment device 200 through this paper layer, e.g., which can be sandwiched between aluminum foil and a protective polyester outer layer (reference all together as 701).

In operation, as this paper layer 701 becomes wetted with the containment solution (which can contain selected/desired dyes and/or have a selected/desired pH), the whole covered surface of the device (or portion thereof) can become discolored (visually obvious) as an indicator that the device has been used. Thus, the paper layer (or other absorbing layer of material) 701 can indicate that the seal 701 of the device has been compromised and has already been used. This effect may be further enhanced by the addition of indicator inks printed on the paper to provide bold graphics (black bars, for example) to serve as a more obvious visual indicator.

Figure 8:
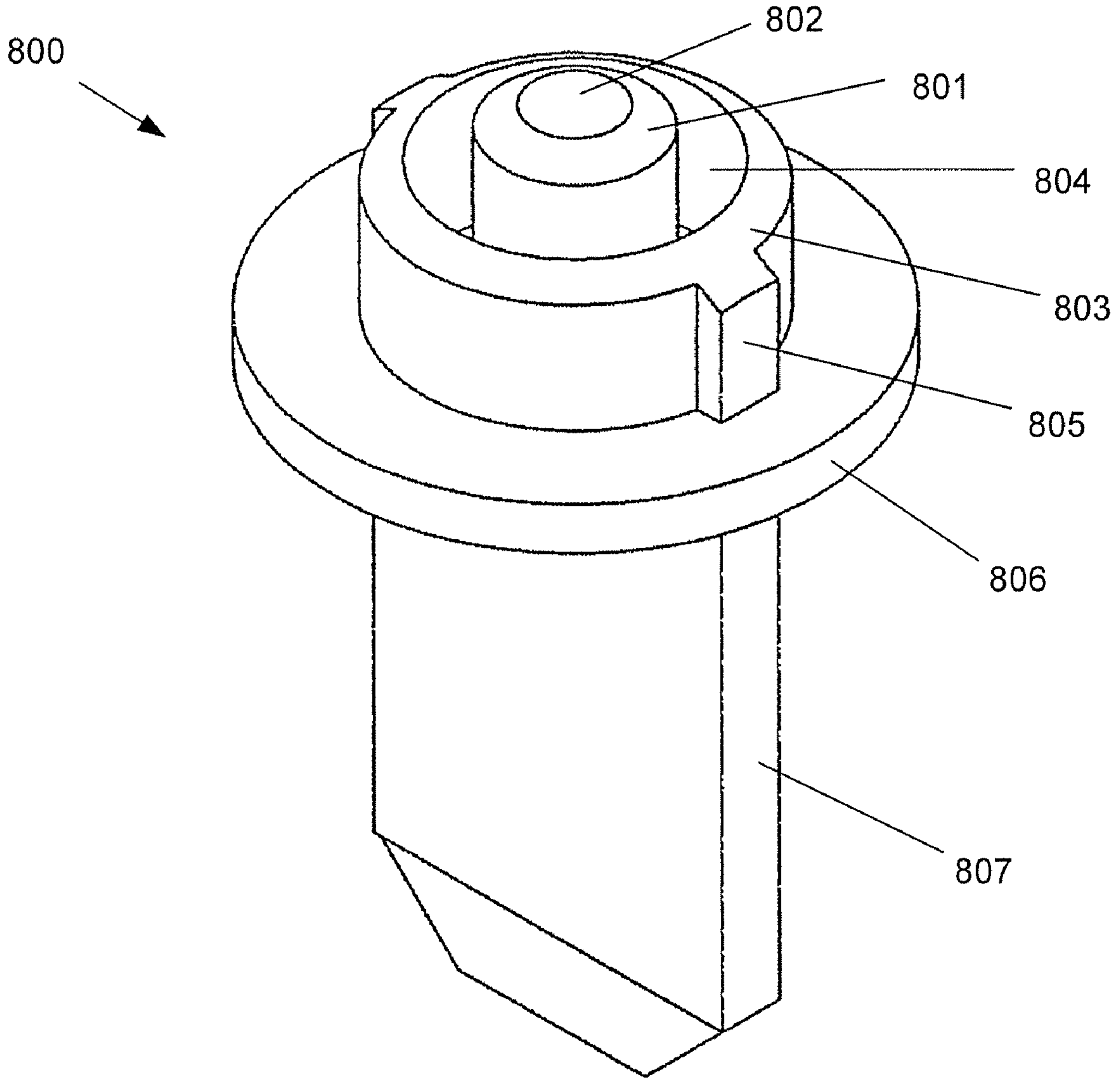
FIG. 8 illustrates another embodiment of the liquid containment structure of the present disclosure with added tapering of the top planar surfaces to allow a smoother presentation of the foil laminate covered top surface and so, greater similarity to a finger.

FIG. 8 illustrates another embodiment of a liquid containment structure/system 800 of the present disclosure. System 800 is similar to system 200 of FIG. 2 in that it includes a body with inner and outer walls 801 and 803 defining inner and outer wells 802 and 804, respectively. System 800 also includes, however, with tapering of the top (i.e., distal from platform 806) planar surfaces of the inner and outer walls 801 and 803 to allow a smoother presentation of the foil laminate covered top surface and so, greater similarity to a finger. While the top surfaces are shown as planar, one or both of them may also include contoured or curved portions or be entirely contoured or curved.

Figure 9A:
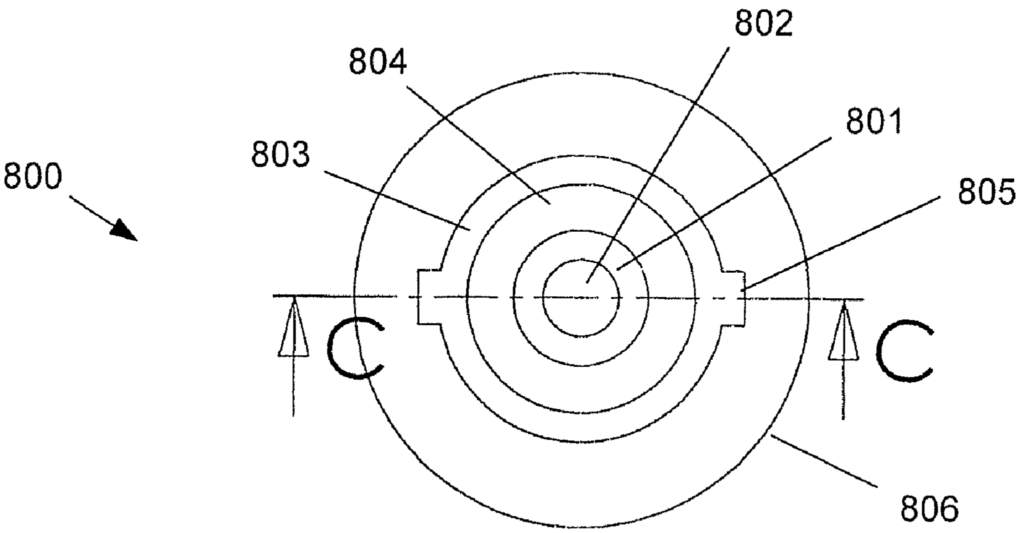
FIG. 9A is a top-down planar view of the liquid containment structure of FIG. 8.
Figure 9B:
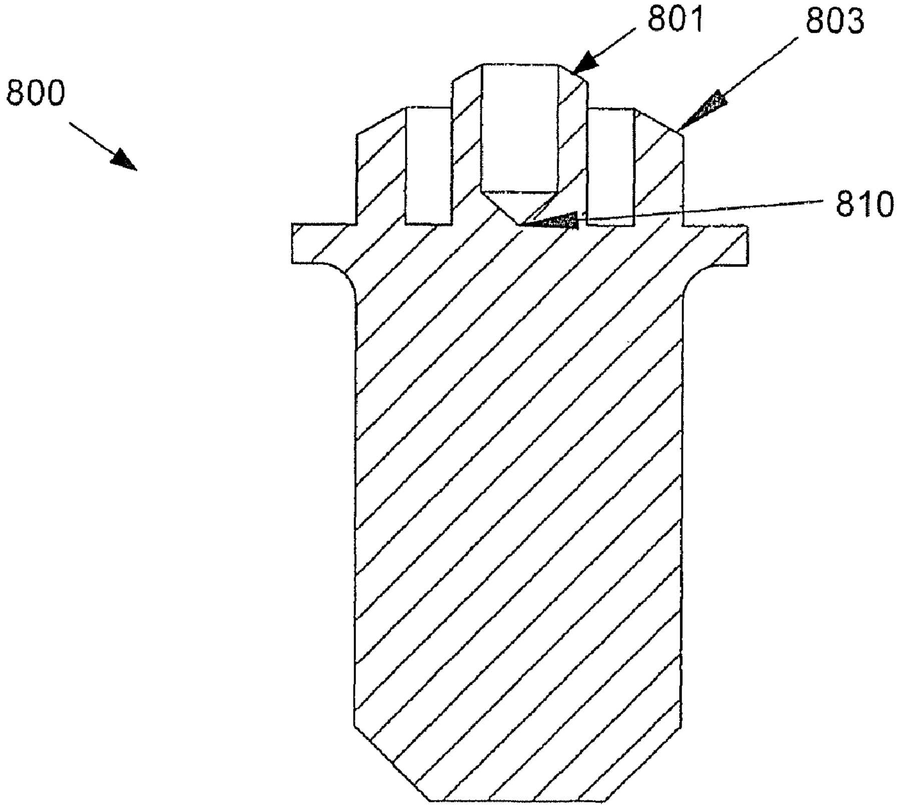
FIG. 9B is a sectional view of the containment structure of FIG. 9A taken along cutting plane C-C.

FIG. 9A is a top-down planar view of the liquid containment structure/system 800 of FIG. 8; FIG. 9B is a sectional view of the containment structure of FIG. 9A taken along cutting plane C-C.

Figure 10:
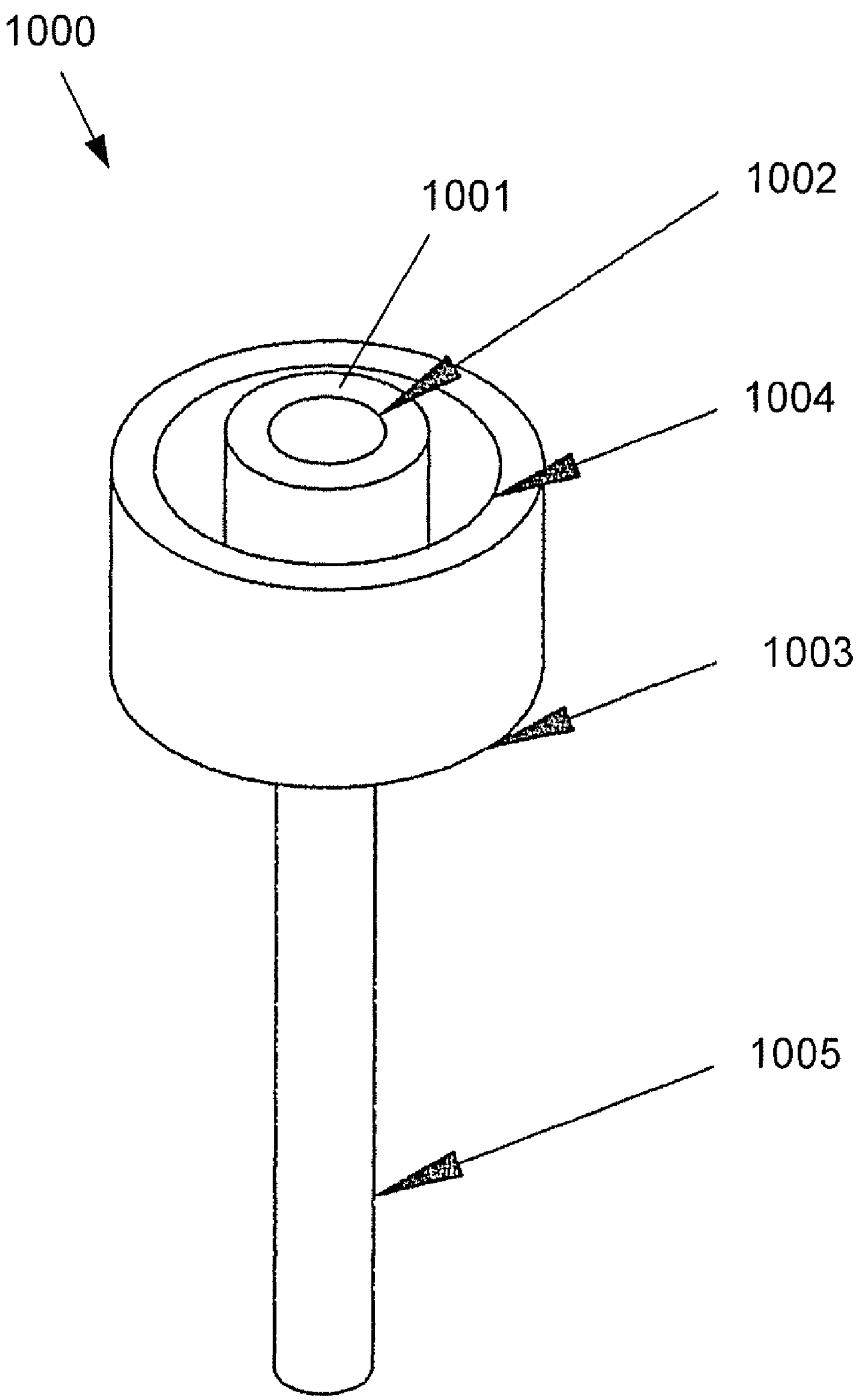
FIG. 10 illustrates yet another embodiment of the liquid containment structure of the present disclosure with a smaller handle portion to reduce the cost of materials, yet reserve space for minimal identification labeling if necessary.

FIG. 10 illustrates yet another embodiment of the liquid containment structure/system 1000 of the present disclosure. System 1000 is similar to system 200 of FIG. 2 in that it includes a body with inner and outer walls 1001 and 1003 defining inner and outer wells 1002 and 1004, respectively, but also includes a base with a smaller handle portion to reduce the cost of materials, yet reserve space for minimal identification labeling if necessary.

Figure 11A:
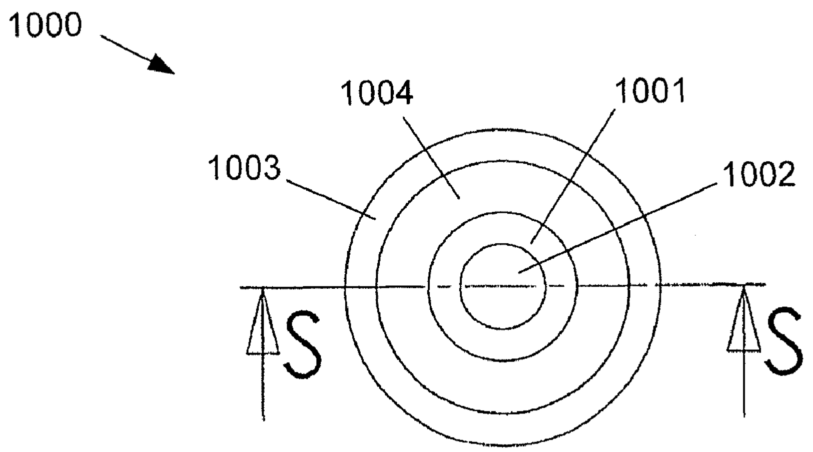
FIG. 11A is a top-down planar view of the liquid containment structure of FIG. 10.
Figure 11B:
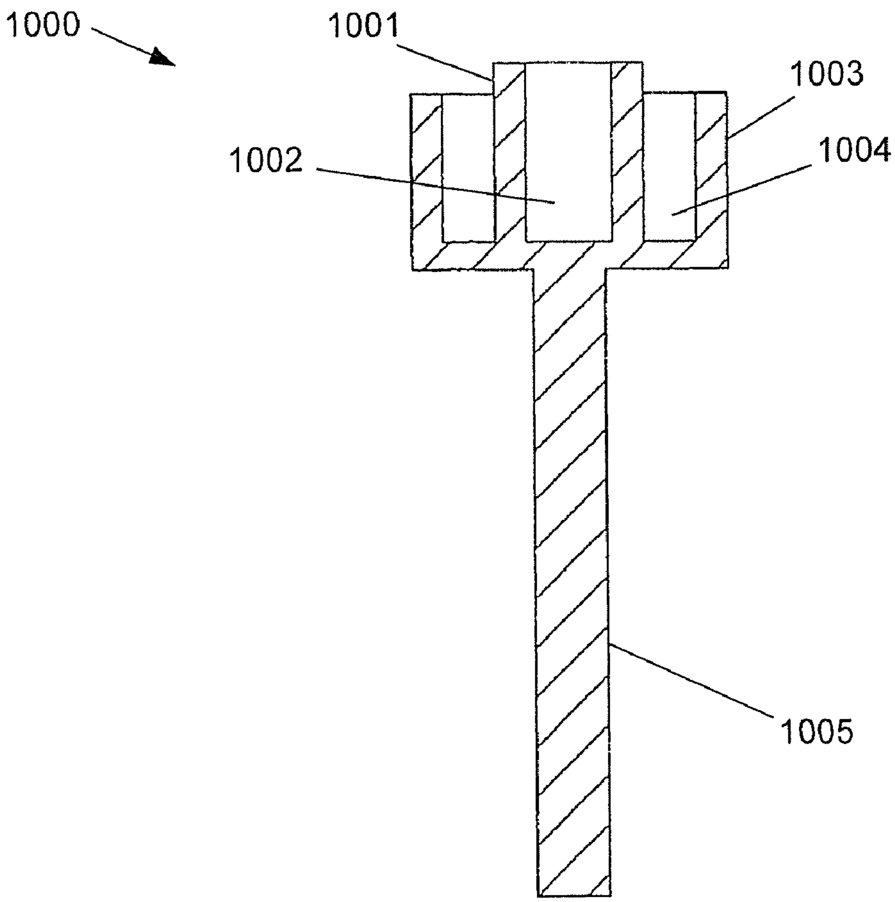
FIG. 11B is a sectional view of the containment structure of FIG. 11A taken along cutting plane S-S.

FIG. 11A is a top-down planar view of the liquid containment structure/system 1000 of FIG. 10; FIG. 11B is a sectional view of the containment structure of FIG. 11A taken along cutting plane S-S.

Figure 12:
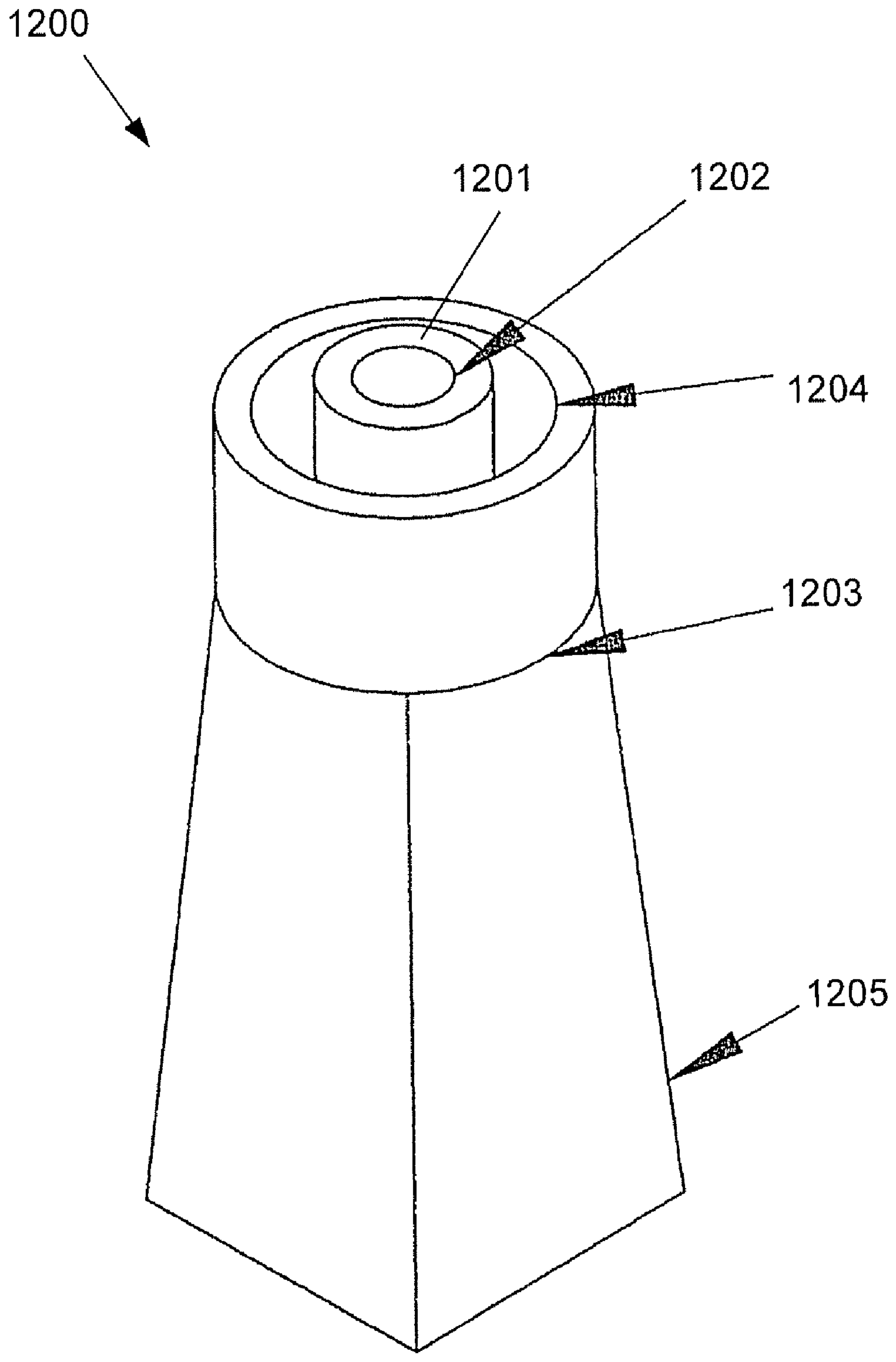
FIG. 12 illustrates yet another embodiment of the liquid containment structure of the present disclosure with a larger handle portion to facilitate use by persons with more limited dexterity, and to provide up to four surfaces to accommodate more extensive labeling information.

FIG. 12 illustrates yet another embodiment of a liquid containment structure/system 1200 in accordance with the present disclosure. System 1200 is similar to system 200 of FIG. 2 in that it includes a body with inner and outer walls 1201 and 1203 defining inner and outer wells 1202 and 1204, respectively, but also includes a base with a larger handle portion 1205 to facilitate use by persons with more limited dexterity, and to provide up to four surfaces to accommodate more extensive labeling information. While handle portion 1205 is shown as having four sides, it may include any desired number of sides.

Figure 13A:
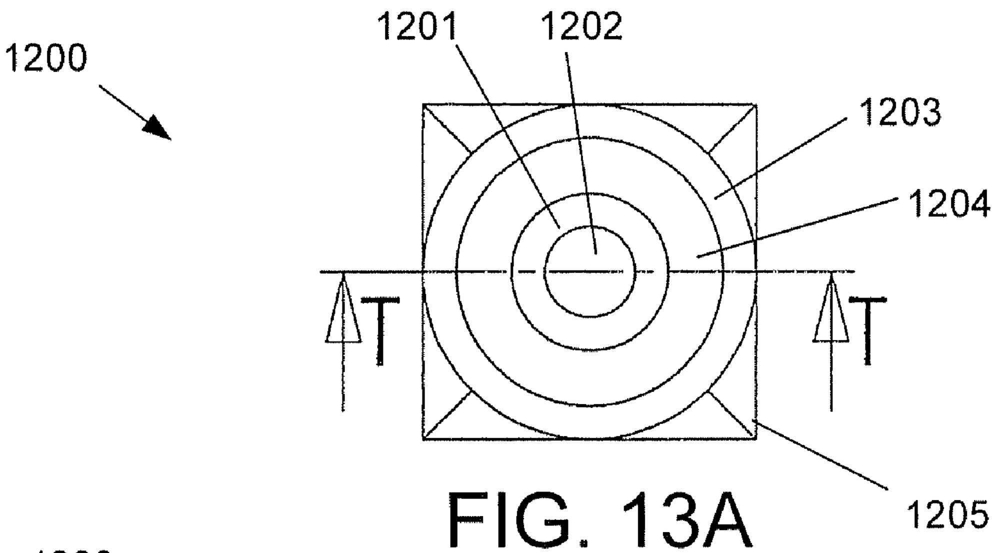
FIGS. 13A and 13B depict a variation of the embodiment of FIG. 12, utilizing a columnar square handle portion.
Figure 13B:
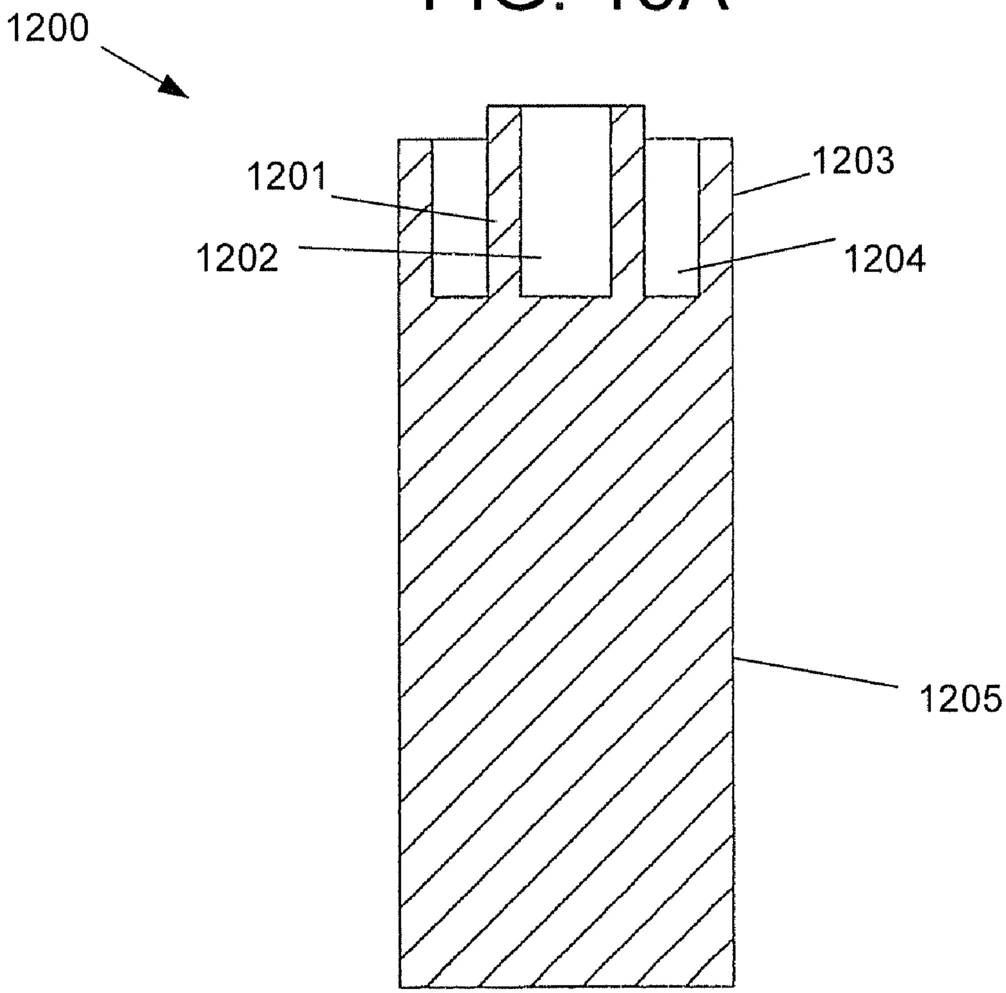

FIG. 13A is a top-down planar view of the liquid containment structure/system 1200 of FIG. 12; FIG. 13B is a sectional view of the containment structure/system 1200 of FIG. 13A taken along cutting plane T-T.

Figure 14:
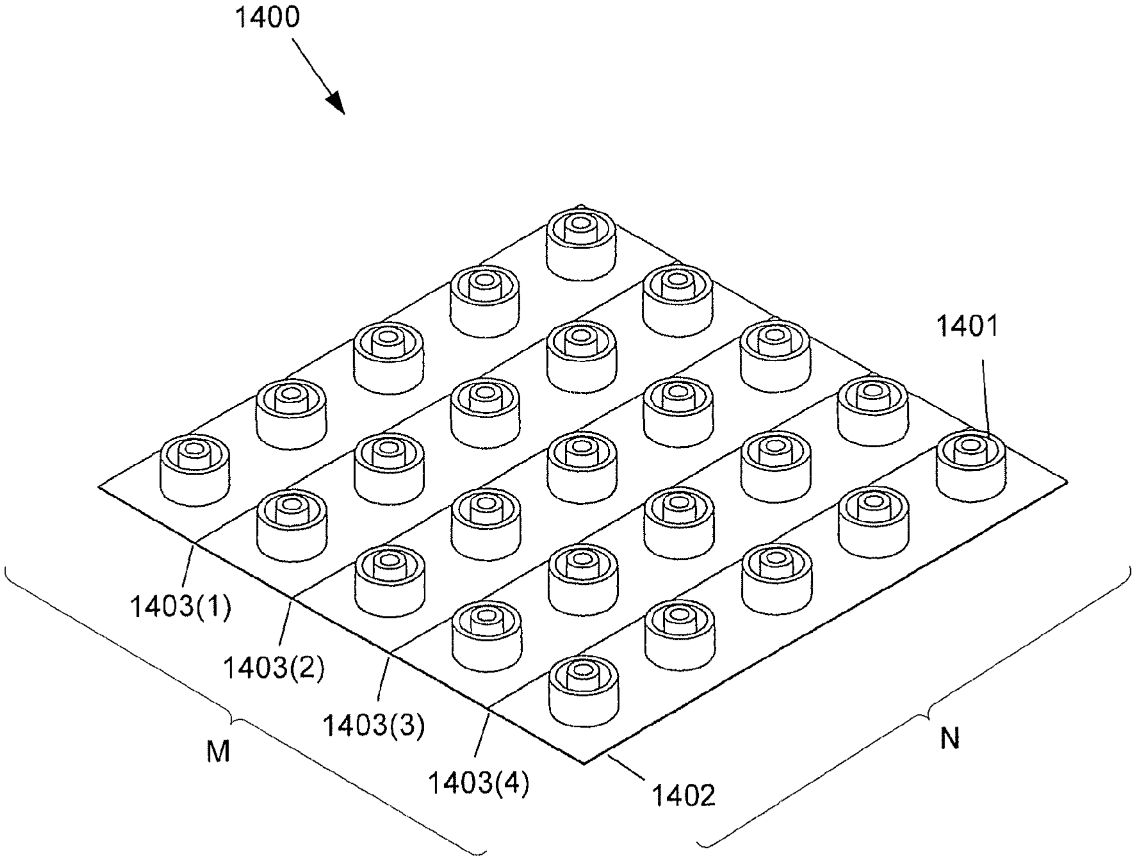
FIG. 14 illustrates use of the liquid containment structure of the present disclosure in sheet having a relatively large number of liquid containment structures.

FIG. 14 illustrates an embodiment 1400 utilizing multiple liquid containment systems 1401, e.g., similar to system 200 of FIG. 2, on a sheet 1402. As show in the drawing, sheet 1402 may be configured and arranged in a desired size such that a desired number of containment systems are arranged on the sheet 1402, e.g., as in a M×N array.

The sheet 1402 may be perforated, as shown by perforations 1403(1)-1403(4), to allow dispensing in units of one or more, and the sheet 1402 may be considered in any length, to allow for rolling for ease of storage or dispensing.

Accordingly, embodiments of the present disclosure can provide control solution containment structures/systems that: present very accurate and repeatable single-doses; prevent against contamination of unused control solution; minimize the risk of user contact with the dispensed solution; provide a practical number of single-dose units, for example, for a single user over a given time period or for short-term mass use by a large number of users such as in a hospital or clinic; facilitate maximizing the shelf life and efficacy of the control solution; provide quality control assessment of a plurality of aspects of integrated test systems; are easy and convenient to use and store; and, are cost effective to manufacture and store.

While the foregoing has described what are considered to be the best mode and/or other exemplary embodiments, it is understood that various modifications may be made therein and that the teachings of the present disclosure may be implemented in various forms and embodiments, and that they may be applied in numerous applications.

What is claimed is:

1. A liquid containment system for holding a control solution and presenting the control solution to a medical device, the system comprising:

a body including two walls defining two wells, each suitable for holding a liquid, wherein the two wells are configured as an inner well and an outer well and the inner well is nested within the outer well;

a control solution disposed within the inner well;

a secondary fill liquid disposed in the outer well for providing a desired vapor pressure; and a cover comprising a seal including a flexible sealing material configured and arranged for sealing the two wells, wherein in a sealed condition the control solution is separate from the secondary fill liquid, and wherein the cover is adapted to be punctured for presenting the control solution to the medical device.

2. The liquid containment system of claim 1, wherein the body further comprises a base.

3. The liquid containment system of claim 2, wherein the two walls comprise an inner and an outer wall that each include a distal surface, and wherein the inner wall distal surface is farther away from the base than the outer wall distal surface.

4. The liquid containment system of claim 3, wherein the distal surface of the inner wall is an oblique angle to a central axis.

5. The liquid containment system of claim 3, wherein the distal surface of the outer wall is an oblique angle to a central axis.

6. The liquid containment system of claim 3, wherein the distal surfaces of the inner and outer walls are contoured.

7. The liquid containment system of claim 3, wherein the inner and outer walls are circular.

8. The liquid containment system of claim 3, wherein the inner and outer walls are elliptical.

9. The liquid containment system of claim 8, wherein the inner and outer walls are configured concentrically arranged about a central axis.

10. The liquid containment system of claim 1, wherein the body comprises high density polyethylene or low density polyethylene.

11. The liquid containment system of claim 1, wherein the cover comprises a flexible foil laminate.

12. The liquid containment system of claim 1, wherein the cover comprises vapor barrier.

13. The liquid containment system of claim 1, wherein the cover comprises a use indicator.

14. The liquid containment system of claim 1, wherein the cover comprises a pH indicator.

15. The liquid containment system of claim 1, wherein the control solution comprises a dye.

16. The liquid containment system of claim 1, wherein the control solution has a desired pH level.

17. The liquid containment system of claim 1, wherein the seal comprises:

a flexible foil laminate;

a protective polyester layer; and a paper layer disposed between the foil laminate and the protective polyester layer.

18. The liquid containment system of claim 17, wherein the foil laminate comprises aluminum foil.

19. The liquid containment system of claim 17, wherein the paper layer is reactive to a desired pH, wherein the paper layer produces a visual indication after absorption of a control solution having the desired pH.

20. The liquid containment system of claim 17, further comprising a vapor barrier disposed on the flexible foil laminate or paper layer.

21. The liquid containment system of claim 1, wherein the inner and outer wells each have a bottom surface, and wherein the bottom surfaces of the inner and outer wells are positioned at different locations along a longitudinal axis of the body.

* * * * *